(12) United States Patent
    Rouaissia et al.

(10) Patent No.:     US 12,568,166 B2
(45) Date of Patent:         Mar. 3, 2026

(54) TIME-AVERAGED PROXIMITY SENSOR

(71) Applicant: Semtech Corporation, Camarillo, CA
              (US)

(72) Inventors: Chaouki Rouaissia, Neuchâtel (CH);
              Sébastien Grisot, Bourdry (CH)

(73) Assignee: Semtech Corporation, Camarillo, CA
              (US)

( * ) Notice:   Subject to any disclaimer, the term of this
              patent is extended or adjusted under 35
              U.S.C. 154(b) by 0 days.

(21) Appl. No.: 17/171,794

(22) Filed:     Feb. 9, 2021

(65)            Prior Publication Data
     US 2021/0266393 A1      Aug. 26, 2021

Related U.S. Application Data

(60) Provisional application No. 62/979,706, filed on Feb.
     21, 2020.

(51) Int. Cl.
     H04M 1/72454      (2021.01)
     G06F 3/04883      (2022.01)
(52) U.S. Cl.
     CPC .... H04M 1/72454 (2021.01); G06F 3/04883
                                              (2013.01)
(58) Field of Classification Search
     CPC .......... H04M 1/72454; H04M 2250/12; G06F
                     3/04883; H03K 2017/9455;
                 (Continued)

(56)            References Cited

U.S. PATENT DOCUMENTS 10,345,879  B2 *  7/2019  Kalam ................... H02J 9/002
     2006/0170411 A1   8/2006  Kurachi et al.
                          (Continued)

FOREIGN PATENT DOCUMENTS

CN        106547638 A      3/2017
     CN        108917797 A     11/2018
                          (Continued)

OTHER PUBLICATIONS

Charbonnier, "Method For Controlling The Level Of Absorbed
Energy Transmitted By A Mobile Phone" (English Translation of EP
1248379 A1) (Year: 2002).*
                          (Continued)

*Primary Examiner* — John T Repsher, III
(74) *Attorney, Agent, or Firm* — BLANK ROME LLP

(57)            ABSTRACT

A proximity sensor for a portable connected wireless device
generating an immediate proximity status signal
(PROXSTAT, 310) that becomes active when a part of a
user's body is close to the proximity sensor, an averaging
unit (259) that may include a FIFO buffer, averaging the
immediate proximity status flag in a predetermined time
window, and a decision unit generating a time-averaged
proximity status flag (350) based on an averaged value of the
immediate proximity status flag in the time window, for
example when the averaged value exceeds a predetermined
threshold. In embodiments, the sensor is configured to
switch temporarily and repeatedly the time-averaged prox-
imity status flag to an inactive state when the value of the
averaged or accumulated value yields an active state of the
                          (Continued)

time-averaged proximity status flag. This feature improves the connectivity when the sensor is used to limit the RF emission of mobile devices.

10 Claims, 5 Drawing Sheets

(58) Field of Classification Search
CPC ....... H03K 2217/94042; H03K 17/945; H03K 17/955; H03K 2217/960705; H04W 52/0254; H04B 1/3838
See application file for complete search history.

(56) References Cited

U.S. PATENT DOCUMENTS

| | | | |
|---|---|---|---|
| 2007/0032967 A1* | 2/2007 | Feen | H03K 17/955 702/47 |
| 2007/0078552 A1* | 4/2007 | Rosenberg | H04W 52/0254 700/94 |
| 2009/0033482 A1* | 2/2009 | Hayter | G16H 40/40 340/691.5 |
| 2013/0222270 A1* | 8/2013 | Winkler | H04M 1/72448 345/1.3 |
| 2013/0241796 A1 | 9/2013 | Nagumo | |
| 2015/0237183 A1 | 8/2015 | Novet | |
| 2016/0105854 A1* | 4/2016 | Lee | H04B 17/102 455/127.2 |
| 2017/0023995 A1* | 1/2017 | Liepold | G06F 1/32 |
| 2018/0076844 A1* | 3/2018 | Park | H04W 52/367 |
| 2018/0331706 A1* | 11/2018 | Nys | H04B 1/3838 |
| 2020/0333861 A1* | 10/2020 | Seyed | G06F 1/206 |
| 2020/0389845 A1* | 12/2020 | Hawaka | H04W 52/0203 |

FOREIGN PATENT DOCUMENTS

| | | | | |
|---|---|---|---|---|
| EP | 1248379 A1 * | 10/2002 | | H04B 1/3838 |
| EP | 3402074 A1 | 11/2018 | | |
| JP | 2006/207269 A | 8/2006 | | |
| KR | 1020110062842 A | 6/2011 | | |
| WO | WO-2012/066838 A1 | 5/2012 | | |
| WO | WO-2013139637 A1 * | 9/2013 | | H03K 17/955 |

OTHER PUBLICATIONS

Average Definition & Meaning. (article) [online]. dictionary.com. Retrieved on Jan. 30, 2025. https://www.dictionary.com/browse/average (Year: 2025).*

European Search Report for EP Application No. 21152816.1, dated Jul. 5, 2021, 7 pgs.

FCC-19-126, "Resolution of Notice of Inquiry, Second Report and Order, Notice of Proposed Rulemaking, and Memorandum Opinion and Order", 2019, 159 pgs.

Translation of Notice of Preliminary Rejection for KR 1020210020220, dated Jan. 18, 2023, 5 pgs.

* cited by examiner

TIME-AVERAGED PROXIMITY SENSOR

REFERENCE DATA

The present disclosure claims priority for U.S. provisional application 62/979,706 of Feb. 21, 2020, the contents whereof are hereby incorporated in their entirety.

TECHNICAL DOMAIN

The present invention concerns a smart proximity sensor and a circuit for processing the output of a proximity sensor. The invention is concerned especially, but not exclusively, with a connected portable device, such as a mobile phone or a tablet that is equipped with such a proximity sensor and processor and is arranged to adapt the RF emitted from a radio interface to maintain a Specific Absorption Rate (SAR), Power Density (PD), or any RF exposure within given limits.

RELATED ART

Capacitive proximity detectors are used in many modern portable devices, including mobile phones and tablets, to determine whether the device is close to a body part of a user. This information is important in several ways: it is used to detect whether the telephone is being actively manipulated by a user, and whether the user is looking at the display, in which case the information displayed can be adapted, and/or the device switch from a low power state to an active one. Importantly, this information is used to adapt the power level of the radio transmitter to comply with statutory SAR limits. Capacitive proximity detection is used also in touch-sensitive displays and panels.

Known capacitive sensing systems measure the capacity of an electrode and, when the device is placed in proximity of the human body (for example the hand, the head, or the lap) detect an increase in capacity. The variations in the sensor's capacity are relatively modest, and often amount to some percent of the "background" capacity seen by the sensor when no conductive body is in the proximity. Known capacitive detection systems may include a digital processor for subtracting drift and noise contributions and deliver a digital value of the net user's capacity in real time and/or a digital binary flag indicating the proximity status based on a programmable threshold.

Proximity sensors are used in portable wireless devices to reduce the power of a radio transmitter when the device is close to the user's body, for example when a mobile phone is moved to the ear for making a call or put in a pocket. By reducing the power only when the device is close, regulatory exposure limits can be respected, without compromising the connectivity excessively, since the device can transmit at maximum power when it is not close to the body.

Exposure limit to radio energy are set by several national and international standards. They generally include both spatial (mass, surface) and time averaging conditions. The ICNIRP standard (74, Health Physics 494 (1998)) provides for averaging over 6 minutes at 10 GHz and reduces to 10 seconds at 300 GHz on a complex basis. The IEEE standard (IEEE Std C95.1-2019 (2019)) has an averaging time of 25 minutes at 6 GHz dropping to 10 seconds at 300 GHz. The FCC (https://docs.fcc.gov/public/attachments/FCC-19-126A1.pdf) proposes an averaging time of 100 seconds below 2.9 GHz dropping to 1 second above 95 GHz.

It is known to limit the power of a radio transmitter in a portable device to keep the average SAR/PD value in a sliding time window below the regulatory safety limit. In this approach, the actual transmission power is reduced according to the monitored traffic, irrespective of whether the device is close to the user or not. These devices do not rely on a proximity sensor to respect the regulatory SAR/PD limits.

SHORT DISCLOSURE OF THE INVENTION

An aim of the present invention is the provision of a proximity sensor, and a processing circuit therefor, that can be used to limit the transmission power of a portable device such as a portable phone. The inventive sensor and processor generate a time-averaged proximity status in a manner that can be used to respect regulatory exposure limits with a minimal impact to the connectivity of the device.

According to the invention, these aims are attained by the object of the attached claims, and especially by a proximity sensor for a portable connected wireless device, the sensor being arranged to determine whether a user is in proximity with its body to the portable connected wireless device, the sensor comprising a processing circuit generating an immediate proximity status signal that can assume proximity-indicating values when a part of a user's body is close to the proximity sensor, and a memory operatively arranged for storing repeated values of the immediate proximity status flag over a time interval, and a decision unit generating a time-averaged proximity status flag based on the number of occurrence of a proximity-indicating value of the immediate proximity status flag in the time interval.

Dependent claims relate to advantageous, but not essential and not necessarily preferred variants such as: a memory including a counter that accumulates the number of occurrences of proximity-indicating values in a granularity interval and/or a FIFO buffer that is periodically supplied with values of the immediate proximity status flag or with values of the counter; a combined proximity status flag resulting from a logic operation on the immediate proximity status flag and on the time-averaged proximity status flag, such as a logic OR or a logic AND, possibly in a selectable fashion; the FIFO buffer with a selectable length; the use of the sensor in a portable connected wireless device to reduce a power of the radio transmitter.

Although the processor of the invention is applicable to proximity sensor of whichever nature, a special use case is that in which the proximity is a capacitive sensor one, based the variations of the capacity seen by a sense electrode. In a cellphone, the electrode can perform double duty as antenna for the radio.

In the context of the present disclosure, a "portable connected wireless device" is a portable device that can be carried by a user and is capable of exchanging data in a wireless network, be it a local area network or a wide area network. Examples of portable connected wireless devices in a local area network may be telephone terminals using the standard DECT or a VoIP connection in a WiFi network, or a WiFi-connected computer, tablet, media player, or book reader. Portable connected wireless devices in a wide area network include of course portable phones, as well as tablets, laptops, and computers having cellphone connectivity. The list is not exhaustive, however.

SHORT DESCRIPTION OF THE DRAWINGS

Exemplar embodiments of the invention are disclosed in the description and illustrated by the drawings in which.

Figures 4, 5:
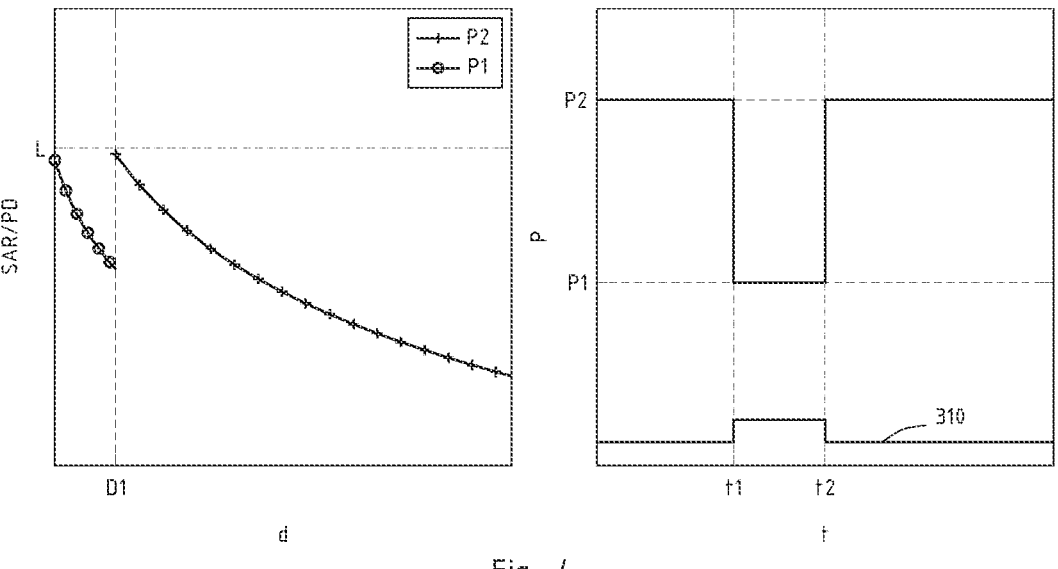

FIGS. 4 and 5 plot the dose over distance and the power over time from a mobile device using a conventional immediate proximity flag and the time-averaged flag of the invention.

Figure 6:
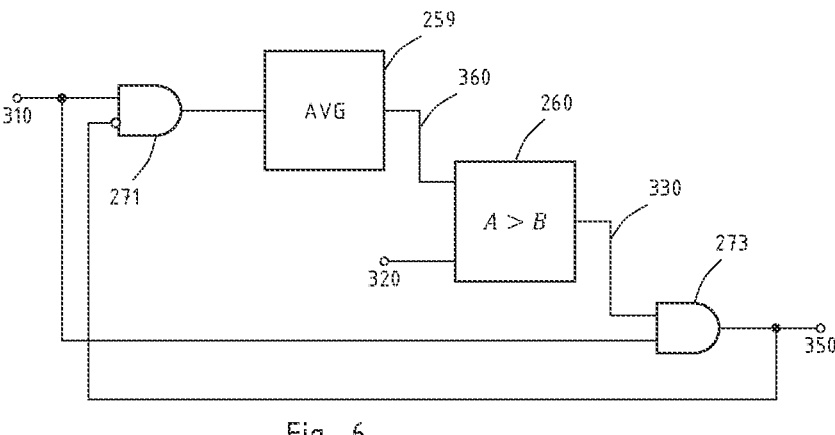
Figure 9:
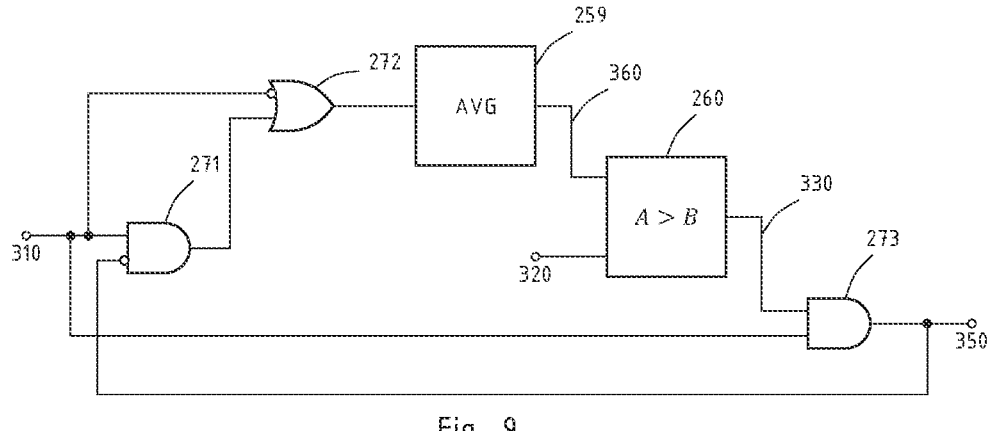

FIGS. 6 and 9 are schematic representations of a variants of the inventive processor.

Figure 7:
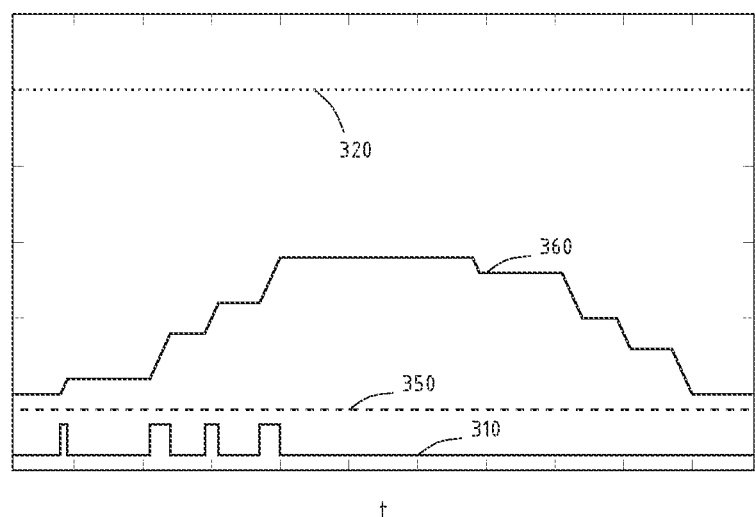
Figure 8:
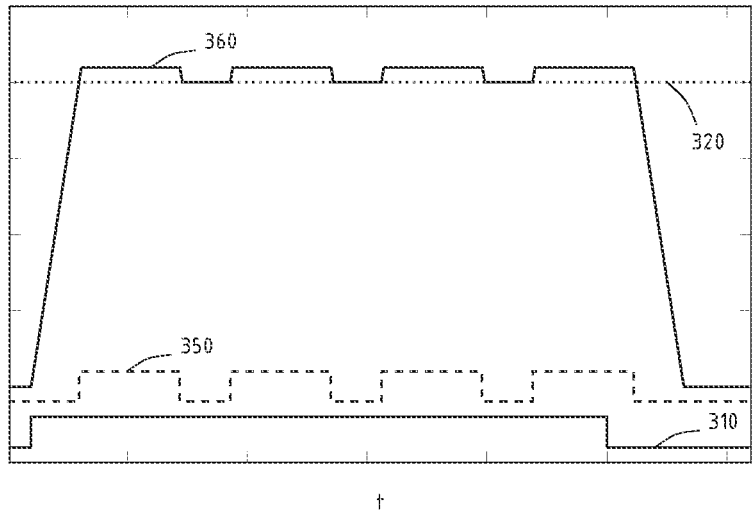

FIGS. 7 and 8 plot the proximity signals generated by the inventive circuit.

EXAMPLES OF EMBODIMENTS OF THE PRESENT INVENTION

Figure 1:
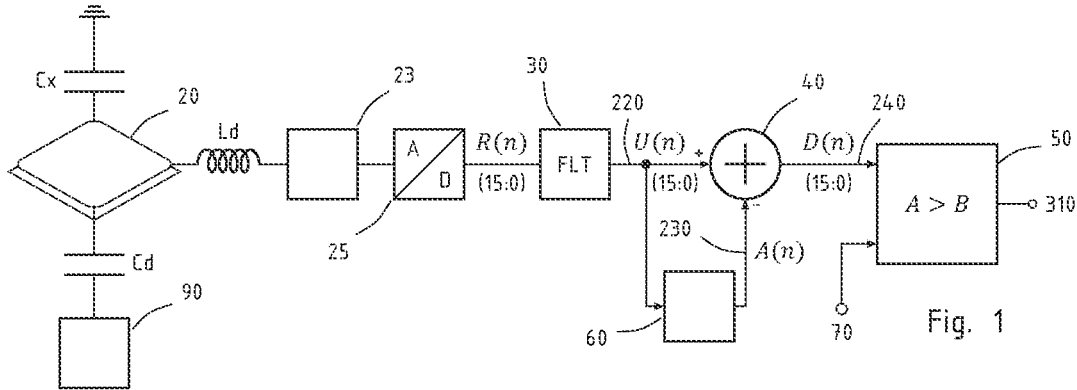
FIG. 1 illustrates schematically a capacitive proximity sensor in a portable connected wireless device.

FIG. 1 shows schematically a capacitive proximity detector in a connected portable device such as a portable phone, laptop computer, or tablet, but the filter and the method of the invention could be applied to diverse fields.

The detector is sensitive to the capacity Cx of an electrode 20 that will increase slightly at the approach of a user's hand, face or body. The variations due to body proximity are overshadowed by the own capacity of the electrode 20 which, in turn, is not stable. The capacity signal is preferably amplified and processed by an analogue processor 23, which may also subtract a programmable offset, and converted into raw digital values by an A/D converter 25. The samples R(n) may be encoded as 16 bits integers, or in any other suitable format.

The raw samples R(n) contain also, in a non-ideal world, noise and unwanted disturbances that are attenuated by a filter 30, providing a series of samples U(n) useful for the processing in the successive stages.

The unit 60 is a baseline estimator that generates a series of samples A(n) that approximate the instantaneous value of the baseline, considering drift. This is then subtracted from the U(n) samples in difference unit 40 and provides the drift-corrected samples D(n). A discriminator unit 50 then generates a binary value 'PROXSTAT' that indicates the proximity of the user's hand, face, or body. In the following, the 'PROXSTAT' variable is treated as a binary value. The invention is not so limited, however, and encompasses detectors that generate multi-bit proximity values as well.

Should the capacitive proximity sensor be part of a connected portable device for SAR control, the sensor electrode 20 will preferably be placed close to the transmitting antenna of the RF transmitter, to determine accurately the distance from the radio source. The sensor electrode 20 could be realized by a conductor on a printed circuit board or on a flexible circuit board and may have guard electrodes on the back and at the sides, to suppress detection of bodies and objects at the back or on the sides of the device.

In the same application, the capacitive electrode 20 could serve also as RF antenna, or part thereof. FIG. 1 shows this feature of the invention. The electrode 20 is connected, through a decoupling capacitor Cd, to a radio transmitter and receiver unit 90, and has an inductor Ld, or another RF-blocking element, to block the radiofrequency signal. Otherwise, the radio unit 90 could be connected to an antenna separate and independent from the sense electrode 20 which, in this case, could be connected directly to the analogue interface 23 without the decoupling inductor Ld.

Figure 2:
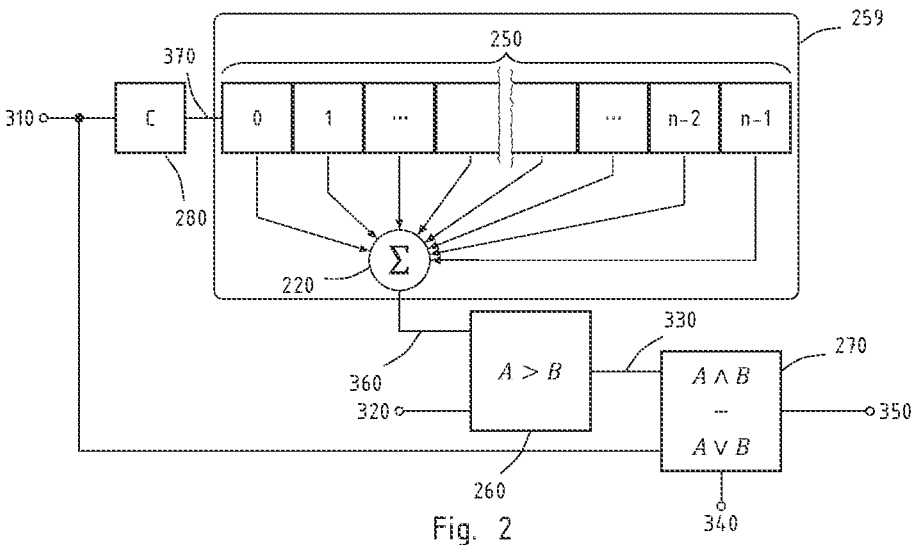
FIG. 2 illustrates the behavior of a part of the processor of the invention.

FIG. 2 show schematically a processor that processes the PROXSTAT signal 310 to determine a time-averaged TIME- AVGSTAT status flag that is high when the user has been close to the device for some time. When the user approaches the telephone to the body, TIMEAVGSTAT does not become high immediately, therefore fleeting approaches do not cause a reduction in transmission power. When the telephone remains in closeness to the user's body for some time, the TIMEAVGSTAT status flag is raised.

To function, the circuit of FIG. 2 has some form of memory that retains a trace of past states of the immediate proximity flag PROXSTAT. While several variants are possible, the circuit of FIG. 2 has an accumulator 280 and a FIFO buffer 250. The PROXSTAT variable is available at terminal 310. the accumulator 280 adds together the values of PROXSTAT each time a new value is available and is periodically reset to zero. The time between successive resets is predetermined and defines a granularity interval.

At the end of the granularity interval, before the resetting of the accumulator 280, a new value is pushed in the FIFO buffer 250 by the serial input 370. If the value of accumulator 280 is zero, or below a determined threshold, then a value '0' is pushed in the FIFO. Otherwise, a value '1' is pushed in the FIFO.

Preferably, the length of the FIFO buffer 250 is variable, and can be set at will, within predefined limits. In an exemplary implementation the buffer 250 can have a length of up to 256 places. The length of the FIFO buffer 250 and the granularity interval between each reset of the accumulator 28 define the length of the sliding window that is used to average the immediate proximity status flag, relative to the rate of generation of new PROXSTAT values.

Note that the purpose of accumulator 280 is to slow down the insertion of new values in the FIFO buffer and, consequently, to limit the length of the FIFO buffer 250 needed to obtain a given time window. The window size is determined in relation to the integration level allowed in the regulation and, if it were quite short and memory were not a limiting factor, the accumulator 280 could be dispensed with.

Note also that the present disclosure deals with the special case in which the immediate status flag PROXSTAT is a one-bit value, and the content of the accumulator 280 is quantized to one bit before being pushed in the FIFO buffer. The FIFO buffer has therefore a width of one bit. This is not a necessary limitation, however, and the invention includes also variants in which the immediate flag PROXSTAT is a multi-bit variable, the accumulator 280 accumulates a suitable function of PROXSTAT that indicates whether or not the device is in proximity, and the values pushed in the FIFO buffer 250 are also multi-bit variables.

Note also that the FIFO buffer 250 can be implemented in various ways without leaving the scope of the invention, for example with a shift register or a ring buffer.

The values comprised in the FIFO buffer 250 are samples of the immediate status flag PROXSTAT in a sliding time window, whose length is defined by the length of the buffer times the granularity interval between successive introductions of new values in the buffer. The adding unit 220 sums all the values in the FIFO buffer—which, the values being single bits, is the same as counting them—and the result is compared with a predetermined threshold 320 in the comparator 260 to produce a time-averaged proximity status flag 330. Preferably, the comparator 260 has an hysteresis to avoid multiple transitions when the input value 360 lingers close to the threshold value 320.

While the figure shows an adder 220 reading all the values in the FIFO buffer through the respective parallel outputs at each cycle, this is not the only manner of implementing a sliding sum. A possible variant, for example, may include a register to which the new values entering the buffer at one side are added, and the old values dropping out of the other side of the buffer are subtracted at each cycle. The block 259 comprising the FIFO buffer 25*a* and the adder 220 can be regarded functionally as an averaging, or as a sliding sum unit. Although the represented variant is preferred, being stable and easy to implement, all possible implementations of averaging units or sliding sum units are included in the scope of the invention.

The time-averaged proximity status TIMEAVGSTAT could be used to modify the power of a radio transmitter of a portable device, in lieu of the immediate proximity status PROXSTAT. In a preferred variant, a logic unit 270 is used to generate a combined status PROXTIMESTAT, available at terminal 350, that is the result of a logic operation on PROXSTAT and TIMEAVGSTAT. The logic operation may be a logic 'or', or a logic 'and', and is preferably selectable by a suitable variable PROXTIMECONFIG, corresponding to wire 340 in FIG. 2.

Figure 3:
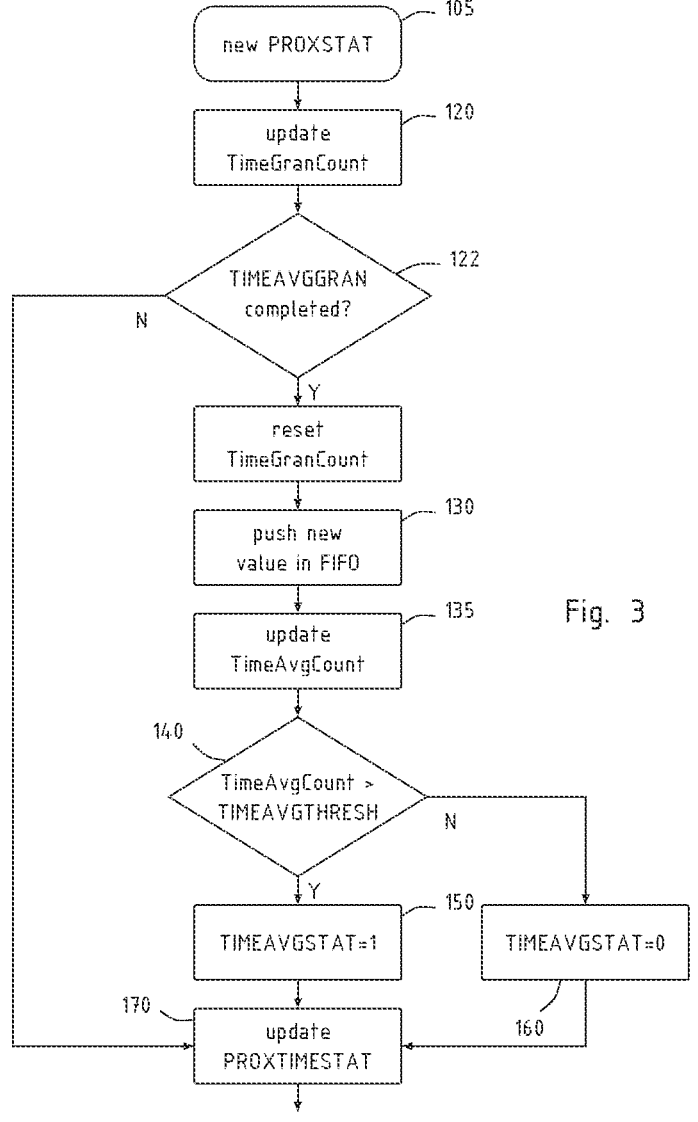
FIG. 3 shows schematically the same behavior, as a flowchart.

FIG. 3 illustrates the behavior of the invention in a flowchart. The flowchart start with the generation of a new value of PROXSTAT (step 105) that the circuit of FIG. 1 produces at periodic regular intervals. In step 120, the accumulator 280, here indicated by the variable 'TimeGran-Count' is updated. In step 122 the system checks whether the current granularity interval is complete. In most cases, the granularity interval will not be complete and the system will take the 'N' branch, update the value of the combined status PROXTIMESTAT (step 170) and end the processing, until the next PROSTAT value is available.

At the end of a granularity interval, the invention pushes a new value in the FIFO buffer (step 130) which new value may be a '0' or a '1' as disclosed above, or another suitable value, if the FIFO buffer allows multi-bit values, the sliding sum TimeAvgCount is recalculated, compared with the threshold value TIMEAVGTHRESH (step 140) and the time-averaged flag TIMEAVGSTAT is set accordingly (steps 150 and 160).

Plots 4 and 5 illustrate how the power of a radio transmitter can be controlled to respect SAR/PD limitations, in the invention. Plots 4 show the situation in which the radio power is governed by the immediate flag PROXSTAT only. The left-side plot shows the dose level as function of the distance for two power levels: P2 is the full power, and P1 is a reduced "safe" power that is selected by the immediate proximity status PROXSTAT, trimmed to fire when the distance reaches the value D1 at which the dose at nominal power reaches the maximum admissible level '1'. The right-side plot shows that the power level is 'P2' when PROXSTAT (trace 310) is inactive and is immediately lowered to 'P1' when PROXSTAT is active.

Plot 5 shows a case in which the output power is governed by the combined status PROXTIMESTAT, computed in this case by a logic 'and' of PROXSTAT (trace 310) and TIME-AVGSTAT (trace 330).

FIG. 6 shows a variant of the invention comprising a logic AND gate 271 at the input of the averaging unit 259. The averaging unit is represented functionally as a block and its internal structure may include the FIFO buffer 250 and sum unit 220 of FIG. 2 or have a different structure. The averaging unit 259 yields a value TIMEAVGCOUNT 360 that count the accumulated length of time during which the proximity signal PROXSTAT was active, in a time window of predetermined length. If the averaging unit is implemented as disclosed in FIG. 2, the window length will correspond to the depth of the FIFO times the update rate, which is determined by the rate of production of new PROXSTAT samples, scaled by the integration time of the counter 280, if present.

The value TIMEAVGCOUNT is compared with a suitable threshold TIMEAVGTHRESH 320 in comparator 260, as in the previous embodiment. A time-averaged proximity flag PROXTIMESTAT 350 is generated if the threshold TIME-AVGTHRESH is exceeded and the PROXSTAT is active, as represented by the logic gate 273, which substitutes, in this embodiment, the multiplexer 270 of FIG. 2.

Importantly, the signal PROXTIMESTAT 350 is fed back to the input of the averaging unit through the logic AND gate 271 that has its inputs tied to the PROXSTAT value and to the complement of PROXTIMESTAT. In this embodiment, the logic gate 271 inhibits the accumulation of new PROXSTAT values if the time-averaged proximity signal PROXTIMESTAT is already active. This is advantageous when the sensor is used to limit the radio power of a mobile device, since it allows the power to return to a high level in short intervals during the whole detection period, rather than allowing a short time of high power only at the beginning, as in the previous embodiment. The inventors have found that this manner of detecting proximity improves significatively the connectivity when the detection period (the window length mentioned above) spans over several minutes.

If, to make an example, the embodiment of FIG. 2 would yield a 2 min high power period at the beginning, and then low power for the rest of detection time, until the device is moved away, this improved embodiment, thanks to the negative feedback disclosed above, would give with similar parameters, a series of 2 min-periods of high power alternated with periods of low power. In this manner, connectivity can be preserved without worsening excessively the SAR.

Manufacturers also have the flexibility to use a shorter FIFO duration while still complying with the SAR limit computed on a longer regulatory window.

FIG. 7 shows the values of the immediate proximity status PROXSTAT (plot 310), the corresponding values of "1" values present in the FIFO buffer TIMEAVGCOUNT (plot 360), the threshold TIMEAVGTHRESH (plot 320) and the time-averaged proximity status TIMEAVGSTAT (plot 350). The digital signals 310 and 350 have been shifted by an arbitrary amount to improve readability.

FIG. 7 corresponds to a scenario in which the mobile device is temporarily moved close to the user in four short intervals, as shown by the immediate proximity status (plot 310). As explained above, this leads to a rise of the TIME-AVGCOUNT value, without however reaching the threshold level (line 320). Consequently, the time-averaged proximity status (plot 350) remains inactive all the time.

FIG. 8 corresponds to a situation where the proximity between the mobile device and the user is protracted, and the proximity sensor is configurated as in FIG. 6. The accumulated value TIMEAVGCOUNT (plot 360) rises steadily until the threshold value 320 is exceeded, whereupon the time-averaged proximity status (plot 350) becomes active. The gate 271 now inhibits the accumulation of further "1" values in the averaging unit 259, the accumulated value 360 after a constant period at high value dips below the threshold line 320, and the time-averaged proximity status becomes temporarily inactive, despite the continuing proximity. The cycle then repeats until the proximity ends.

FIG. 9 shows another variant in which the PROXSTAT signal is gated by logic gate 271 and by a second OR gate 272 with an input receiving the complementary value of PROXSTAT. This variant works as that of FIG. 6 when PROXSTAT is active. When PROXSTAT is inactive, however, the averaging unit 259 is pre-filled with "1" values, which may provide a faster response. The logic gates at 271 and 272 simulate an active PROXSTAT value even though PROXSTAT is inactive and fill the memory of the averaging unit accordingly. When the mobile device is brough in proximity with a body part of the user, the PROX-TIMESTAT flag will immediately turn to active.

TABLE variables

| symbol | meaning |
| --- | --- |
| A(n) | baseline estimation |
| D(n) | baseline-subtracted data |
| R(n) | raw capacity data |
| U(n) | useful (filtered) data |
| PROXSTAT | immediate proximity status |
| PROXTIMECONFIG | selects operation generating PROXTIMESTAT (logic AND or logic OR) |
| PROXTIMESTAT | combined proximity status threshold for the immediate proximity status |
| TIMEAVGCOND | selects whether the power is determined by PROXSTAT/PROXTIMESTAT |
| TIMEAVGCOUNT | how many '1' are currently present in the FIFO buffer |
| TIMEAVGDURATION | length of the FIFO buffer |
| TimeAvgFifo | The FIFO buffer: up to 256 past values |
| TIMEAVGGRAN | time granularity of the insertion in the FIFO buffer |
| TIMEAVGINIT | defines how the FIFO buffer is initialized |
| TIMEAVGSTAT | time-averaged proximity status |
| TIMEAVGTHRESH | threshold for TIMEAVGSTAT to be set |
| TimeGranCount | counts how many times PROXSTAT was set during the current TIMEAVGGRAN interval |

REFERENCE SYMBOLS IN THE FIGURES

Ld decoupling inductance
Cx tactile capacitance
Cd decoupling capacitance
20 electrode
23 analogue processor
25 A/D converter
30 filter
40 difference
50 discriminator
60 baseline estimator
70 threshold
90 receiver
105 generation of a new PROXSTAT value
120 counting
122 end of granularity interval
130 push into shift register
135 update TimeAvgCount
140 comparison with TIMEAVGTHRESH
150 set time-averaged proximity flag
160 reset time-averaged proximity flag
170 logic operation
220 sum
250 FIFO buffer
260 comparator
270 logic operation
280 counter
310 PROXSTAT variable
320 TIMEAVGTHRESH variable
330 TIMEAVGSTAT variable

8

340 PROXTIMECONFIG variable
350 PROXTIMESTAT variable
360 TimeAvgCount variable
370 serial input of the FIFO buffer
The invention claimed is:

1. A capacitive proximity sensor in a portable connected wireless device that includes a radio transmitter, the capacitive proximity sensor comprising a processing circuit configured to acquire a capacitance of a sense electrode and subtract drift and noise contributions from the capacitance and generate a digital variable that indicates that the sense electrode has detected a part of a user's body, an averaging unit including a FIFO buffer that is periodically supplied, following an update rate, with values of the digital variable, wherein the averaging unit is configured to produce an average value by averaging or accumulating values of the digital variable in the FIFO buffer within a time window that has a length of more than one minute, wherein the length of the time window is determined by a depth of the FIFO buffer and by the update rate, and a decision unit setting a time-averaged proximity status flag in an active state when the average value exceeds a predetermined threshold, wherein the capacitive proximity sensor is configured to reduce a power of the radio transmitter in response to the active state of the time-averaged proximity status flag, the averaging unit comprising an input logic gate configured to inhibit supplying of the values of the digital variable to the FIFO buffer when the average value exceeds the predetermined threshold.

2. The capacitive proximity sensor of claim 1, arranged to generate a combined proximity status flag that results from a logic operation on the digital variable and on the time-averaged proximity status flag.

3. The capacitive proximity sensor of claim 2, wherein the logic operation is selectable from: a logic OR; a logic AND.

4. The capacitive proximity sensor of claim 1, the averaging unit including a FIFO buffer with a selectable length.

5. The capacitive proximity sensor of claim 1, including a logic circuit configured to inhibit the transmission of further values of the digital variable to the averaging unit if the time-averaged proximity status flag is active, whereby the average value sinks below the predetermined threshold, the time-averaged proximity flag is set in an inactive state, the power of the radio transmitter is temporarily increased and further values of the digital variable are allowed into the averaging unit, causing the average value to exceed the predetermined threshold, the time-averaged proximity flag to be set in the active state and the power to be reduced again.

6. The capacitive proximity sensor of claim 1, the sense electrode being also an antenna of the radio transmitter emitting radio waves.

7. The capacitive proximity sensor of claim 1, the digital variable being a binary variable or a multi-bit variable.

8. A portable connected wireless device comprising:
a radio transmitter,
a processing circuit configured to acquire a capacitance of a sense electrode and subtract drift and noise contributions from the capacitance and generate a digital variable that indicates that the sense electrode has detected a part of a user's body based on the capacitance of the sense electrode,
an averaging unit including a FIFO buffer that is periodically supplied, following an update rate, with values of the digital variable, wherein the averaging unit is configured to produce an average value by averaging or accumulating all the values of the digital variable in the FIFO buffer within a time window that has a length of more than one minute, wherein the length of the time window is determined by a depth of the FIFO buffer and by the update rate, a decision unit setting a time-averaged proximity status flag in an active state when the average value exceeds a predetermined threshold, wherein the decision unit is configured to reduce a power of the radio transmitter in response to the active state of the time-averaged proximity status flag, the averaging unit comprises an input logic gate configured to inhibit supplying of the values of the digital variable to the FIFO buffer when the average value exceeds the predetermined threshold.

9. The portable connected wireless device of claim 8, including a logic circuit configured to inhibit the transmission of further values of the digital variable to the averaging unit if the average value exceeds the predetermined threshold, whereby the average value sinks below the predetermined threshold and the power of the radio transmitter is temporarily increased and further values of the digital variable counter are allowed into the averaging unit causing the average value to exceed the predetermined threshold and the power to be reduced again.

10. The capacitive proximity sensor of claim 1, wherein the input logic gate causes an increase in the power of the radio transmitter when a part of a user's body is detected by the sense electrode.

* * * * *